(12) United States Patent
Simmons, Sr.

(10) Patent No.: US 11,221,038 B1
(45) Date of Patent: Jan. 11, 2022

(54) APPARATUS FOR AND METHOD OF CREATING A SUPER HYPERMOBILE, SUPER MAGNETIC JOINT

(71) Applicant: Dennis C Simmons, Sr., Overland Park, KS (US)

(72) Inventor: Dennis C Simmons, Sr., Overland Park, KS (US)

(*) Notice: Subject to any disclaimer, the term of this patent is extended or adjusted under 35 U.S.C. 154(b) by 115 days.

(21) Appl. No.: 15/974,390

(22) Filed: May 8, 2018

(51) Int. Cl.
| F16C 11/06 | (2006.01) |
| F16C 11/04 | (2006.01) |
| F16B 1/00 | (2006.01) |
| F21V 21/29 | (2006.01) |

(52) U.S. Cl.
CPC .............. F16C 11/04 (2013.01); F16B 1/00 (2013.01); *F16B 2001/0035* (2013.01); *F21V 21/29* (2013.01)

(58) Field of Classification Search
CPC ............... F21V 21/29; F16C 11/04; F16C 11/06–086; F16B 2001/0035; Y10T 403/32032
USPC .......................................................... 403/56
See application file for complete search history.

(56) References Cited

U.S. PATENT DOCUMENTS

| 4,719,549 | A  | * | 1/1988  | Apel .................. | F21V 21/08 |
|           |    |   |         |                       | 362/398    |
| 6,749,480 | B1 | * | 6/2004  | Hunts ................. | A63H 33/046 |
|           |    |   |         |                       | 446/85     |
| 7,160,170 | B2 | * | 1/2007  | Yoon .................. | A63H 33/046 |
|           |    |   |         |                       | 273/156    |
| 8,187,006 | B2 | * | 5/2012  | Rudisill .............. | H01R 11/30 |
|           |    |   |         |                       | 439/39     |
| 8,900,009 | B2 | * | 12/2014 | Hornick ............... | F16M 11/14 |
|           |    |   |         |                       | 439/571    |
| 9,300,081 | B2 | * | 3/2016  | Rudisill .............. | H01R 13/6205 |
| 9,636,600 | B2 | * | 5/2017  | Rudisill .............. | A63H 33/046 |
| 9,773,601 | B2 | * | 9/2017  | Breiwa ................ | F16M 13/02 |
| 10,215,386 | B1 | * | 2/2019  | Zimmerman ........... | F21V 21/29 |

FOREIGN PATENT DOCUMENTS

WO    WO-2013032261 A1 * 3/2013 .............. F21V 21/29

* cited by examiner

*Primary Examiner* — Joshua T Kennedy

(57) ABSTRACT

Disclosed are methods and apparatuses for creating hypermobile joints; hypermobile magnetic joints; super hypermobile joints; and super hypermobile, super magnetic joints. Joints can be simple magnetic, where one ferromagnetic element is a permanent magnet and the other is not; or super magnetic, where both are permanent magnets. Super hypermobile magnetic joints are created with two enclosures, joined magnetically and free to rotate around the other, with ferromagnetic elements inside the enclosures magnetized. As the moments of the magnetic domains of the enclosed magnetized ferromagnetic elements align parallel to each other inside each enclosure, as well as to the moments of the magnetic domains of the other magnetized ferromagnetic elements inside the other enclosure, the resulting magnetic attraction/attachment brings the enclosures together completing the joint. The frictional forces on the surfaces of the enclosures maintains the positions of the enclosures, and thus the joint.

4 Claims, 6 Drawing Sheets

APPARATUS FOR AND METHOD OF CREATING A SUPER HYPERMOBILE, SUPER MAGNETIC JOINT

CROSS-REFERENCE TO RELATED APPLICATION

Not Applicable

FIELD OF THE DISCLOSURE

The present disclosure relates to a device/apparatus creating a super hypermobile, super magnetic joint, by allowing enclosures of the joint to rotate freely around the other; with all ferromagnetic elements inside the enclosures magnetized; the moments of the magnetic domains of the magnetized ferromagnetic elements aligned parallel to each other inside each enclosure, as well as to the moments of magnetic domains of magnetized ferromagnetic elements of the other enclosure; and the resulting magnetic attraction/attachment creating forces on the surfaces of the enclosures creating the joint.

The present disclosure further relates to enabling a device/apparatus using the force of friction created from the attraction of multiple ferromagnetic elements on opposite sides of a steady/fixed surface, magnetically attracted/attached to each other, with at least one of the ferromagnetic elements magnetized, to keep either of two or more connected support links, rods, arms, limbs, or something similar in desirable positions when moved.

Controlling an apparatus/device position often requires a physical connection with set screws, springs, hydraulics and/or other types of direct contact for maintaining a device/apparatus in space. The present disclosure creates a device for and method of creating connections for joints without them being physically connected, as well as to improve the accuracy and flexibility of positioning a device/apparatus in space, In the past, if the ends of joining links, rods, arms, limbs, or something similar of a device/apparatus had fixed magnetized ferromagnetic elements for their joints, they could magnetically attach/attract to each other, but only at an angle that allowed the moments of their magnetic domains to align parallel.

An easy way to picture this is to take two permanent magnets physically attached to the ends of two separate rods/links such that they are magnetically attracted/attached to each other. They will always align the same way because the moments of the magnets of the "permanent" magnets are "permanently" set. You cannot flex one rod/link with respect to the other and have it stay in the moved position. It will bounce back till the moments of the magnetic fields are parallel once again.

A force greater than the magnetic force keeping the two magnetic joints attached/attracted to each other could move a link, rod, arm, limb, or something similar relative to the other temporarily, but when let go, the link, rod, arm, limb, or something similar will snap-back to the original position where the fixed moments of the magnetic domains re-align parallel again. The device/apparatus would lack flexibility in position because of this. The present invention solves this problem creating a hypermobile magnetic joint.

If one of the ferromagnetic elements at the end of a link, rod, arm, limb, or something similar was not magnetized, the moments of the particular magnet's domains were not fixed, and so adjustable flexible positioning could occur of the links, rods, arms, limbs, or something similar, but at a much-sacrificed ability to maintain positioning of a device/apparatus. With only one of them magnetized, this force of attraction is much less than it would be if both of them were magnetized.

As the magnetized ferromagnetic element (fixed magnetic domains) moved relative to the unmagnetized ferromagnetic element (unfixed magnetic domains), the moments of the unfixed magnetic domains moved dynamically to stay aligned with the moments of the fixed magnetic domains affording flexible positioning. But this cannot happen with both ferromagnetic elements fixed and magnetized.

The aforementioned suggests maintaining a device/apparatus in space could be significantly improved if it were possible to have both ferromagnetic elements attracted/attached to each other magnetized.

The present disclosure solves this problem and allows the superior forces of two or more magnetized ferromagnetic elements to create a hypermobile joint and maintain flexible positioning of a device/apparatus in space by replacing at least one of the fixed magnetized elements with a mounted/fixed unmagnetized surface or enclosure, and then placing the removed magnetized ferromagnetic element(s) inside the newly fixed/attached and unmagnetized enclosure(s), where these magnetized ferromagnetic elements are unfixed and free to rotate/move about.

The present disclosure simply invents a method and device that allows permanent magnets to still be magnetically attached/attracted to each other on the end (inside the enclosure) of separate links/rods, but with the ability for the links/rods to bend or flex at the joint.

With the enclosure fixed instead of the magnetized ferromagnetic element(s), the magnetized ferromagnetic element(s), now inside the enclosure and free to move, can rotate with regard to other magnetized ferromagnetic element(s) on the other side of the surface or enclosure to keep the moments of the magnetic domains aligned parallel.

This greatly improves the strength/frictional force that keeps the link, rod, arm, limb, or something similar in position since it is now that of two or more magnetized ferromagnetic elements attracted/attached to each other, with the surface between them.

In summary, by allowing at least one of the magnetized ferromagnetic elements to float or be unfixed in position inside of a steady/fixed enclosure, even with all of the ferromagnetic elements magnetized; a hypermobile joint can be created providing for adjustable/flexible positioning of the device/apparatus with superior ability to maintain position.

BACKGROUND OF THE INVENTION

The background description provided herein is for the purpose of generally presenting the context of the disclosure. Work of any named inventors, to the extent it is described in this background section, as well as aspects of the description that may not otherwise qualify as prior art at the time of filing, are neither expressly nor impliedly admitted as prior art against the present disclosure.

In the past, devices/apparatuses have primarily been positioned in space by the use of physical connections with physical joints. FIG. 1 shows a typical embodiment with physically connected joints FIG. 1 (3) for flexible positioning and a lamp FIG. 1 (6) at the end.

In FIG. 1, when components of the embodiment are moved, the physical joints FIG. 1 (3) pivot, and the springs FIG. 1 (4) adjust their length with a desired force of keeping the lamp in the newly moved position.

The present invention allows for the movement of a link, rod, arm, limb, or something similar magnetically connected to another link, rod, arm, limb, or something similar, to be moved at any angle relative to the other.

With the type of embodiment in FIG. 1, when a new position is desired for a component in the z axis FIG. 1 (102), the complete embodiment has to pivot/rotate around the base FIG. 1 (1) at the pivot point FIG. 1 (2). This is severely limiting in the adjustability and flexibility of the positioning of the lamp if an obstacle lies in the path of any of the components of the embodiment. In addition, the links/arms of the lamp will collide with each other while moving up or down on the y axis; left and right on the x axis, or back and forth on the z axis, impeding their flexibility in position.

If anew position is desired for a component of the embodiment in the x-axis FIG. 1 (100), y-axis FIG. 1 (101), or z-axis (102), similarly, the joints FIG. 1 (3) have to move and be repositioned with the springs FIG. 1 (4) counterbalancing the force of gravity on the components of the embodiment. If anything lies in the path of any of the components of the embodiment in FIG. 1, the flexibility and adjustability of the location of the components are limited.

The joints FIG. 1 (3) only have one-dimensional positioning capability since they are physically attached/fixed joints. These links only move up and down relative to a joint. The ability to move a component of the apparatus to a position that may appear to be on the z axis FIG. 1 (102) is achieved by the movement of all of these joints moving in harmony at the same time with their one dimension.

Depending on the new location desired, it is likely one joint can't be moved to accomplish the task, and instead they all have to participate. The base pivot joint FIG. 1 (2) rotates around the y axis FIG. 1 (101) (one dimension), and the joints FIG. 1 (3) only move up and down in one dimension to achieve the newly desired position. Movement of the embodiment back and forth (z-axis) is actually achieved by these joints still only moving up and down individually.

Additionally, the ability of a component retaining its position accurately after being moved is sacrificed with the type of embodiment in FIG. 1. The ability for a component of the embodiment to retain its position after being adjusted or moved is directly tied to the springs correctly counter-balancing the force of gravity on the components. The force the springs have to exert counter-balancing the components is tied to the weight/mass of the components of the embodiment and has to be different for components with a different weight/mass.

A "spring-back' like effect is a normal consequence of such an embodiment, and because of this, it is rare the device/apparatus will stay where it is moved.

The present invention solves the above aforementioned problems with flexibility and/or adjustability of positioning components of an embodiment by allowing the joints to have three (3) dimensional positioning in space, as well as to eliminate the "spring back" like effect after moving a component of the embodiment.

And in addition, the accuracy of positioning is much improved for a component of an embodiment with the present invention since alignment of the joints is done at an atomic level with moments of magnetic domains aligning in parallel with each other.

The present invention further improves the "spring-back" effect with a typical embodiment such as FIG. 1 since friction is the force used to maintain the positions of the components after moving a component, and not springs.

Referring to FIG. 2, it can be seen that an example embodiment consists of some sort of base FIG. 2 (1); with a physically attached non-magnetized ferromagnetic element FIG. 2 (1A); a magnetized ferromagnetic element FIG. 2 (2) physically attached to a link, rod, arm, limb, or something similar FIG. 2 (4); frictional points FIG. 2 (3) from magnetic forces to support links, rods, arms, limbs, or something similar FIG. 2 (4); fixed ferromagnetic cylindrical elements FIG. 2 (4A) embedded and at the end of links, rods, arms, limbs, or something similar FIG. 2 (4); floating/unfixed in position magnetized spherical ferromagnetic elements FIG. 2 (7) inside fixed/physically attached enclosures FIG. 2 (5); and a device/apparatus on the end FIG. 2 (8), ultimately supported by the comprised hypermobile magnetic joints FIG. 2 (9), FIG. 2 (10), FIG. 2 (11), and FIG. 2 (12).

IG. 3 shows a blown-up image of an example joint with an embedded magnetized cylindrical ferromagnetic element FIG. 3 (1); embedded in one of the links, rods, arms, limbs, or something similar FIG. 3 (2); magnetically attached/attracted FIG. 3 (3) to a floating spherical magnetized ferromagnetic element FIG. 3 (7); inside a fixed/attached non-ferromagnetic enclosure FIG. 3 (5); physically attached FIG. 3 (6) to a link, rod, arm, limb, or something similar FIG. 3 (4).

The invention creates flexibility in positioning by allowing ferromagnetic elements inside enclosures, links, rods, arms, limbs, or something similar to magnetically attach/attract to magnetized elements on the other side of a surface, and/or inside an enclosure that are not fixed in position and free to float.

As magnetized ferromagnetic element(s) FIG. 3 (7) floating inside a fixed/physically attached enclosure FIG. 3 (5) become with-in the magnetic field of other magnetized ferromagnetic element(s) floating inside another physically attached enclosure, or on the other side of a surface, the two independent ferromagnetic elements will be magnetically attracted/attached to each other with the fixed surface/enclosure between.

The frictional force of the two ferromagnetic elements magnetically attracted/attached to each against the sides of the physically attached surface/enclosure maintains the position of the components of the embodiment.

The connecting links, rods, arms, limbs, or something similar, with the physically attached joints/enclosures can be magnetically attached to each other for nesting or daisy chaining.

A base is not actually required for portable magnetic fixation since at the end of links, rods, arms, limbs, or something can be magnetized ferromagnetic elements. This luxury allows a link to connect to any ferromagnetic surface without the need of an actual base. An example surface would be the hood of a car made out of ferromagnetic material.

The form of the invention adopted herein for purposes of illustration is embodied in a lamp, although the invention is not limited thereto, since it employs magnetized ferromagnetic joint principles which may be used to support other apparatuses/devices in an adjustable manner.

BRIEF SUMMARY OF THE INVENTION

The primary objective of the present invention is to provide an apparatus for creation of a hypermobile joint.

Another objective of the invention is to provide an improved method for creation of a hypermobile joint.

Yet another objective of the present invention is to provide an apparatus for creation of a hypermobile magnetic joint.

Yet another objective of the invention is to provide an improved method for creation of a hypermobile magnetic joint.

Yet another objective of the present invention is to provide an apparatus for creation of a super hypermobile magnetic joint.

Yet another objective of the invention is to provide an improved method for creation of a super hypermobile magnetic joint.

Yet another objective of the present invention is to provide an apparatus for creation of a super hypermobile, super magnetic joint.

Yet another objective of the invention is to provide an improved method for creation of a super hypermobile, super magnetic joint.

Yet another objective of the present invention is to provide an improved apparatus for more flexibility/adjustability in positioning an embodiment or the components of the embodiment.

Yet another objective of the invention is to provide an improved method for more flexibility/adjustability in positioning an embodiment or the components of the embodiment.

Yet another objective of the invention is to provide an improved device for maintaining the position of an embodiment or the components of an embodiment in space after the embodiment or the components of the embodiment are moved.

Yet another objective of the invention is to provide an improved method of maintaining the position of an embodiment or the components of an embodiment in space after the embodiment or the components of the embodiment are moved.

Yet another objective of the invention is to provide an apparatus where links, rods, arms, limbs, devices, or something similar can be attached to each other without a fixed physical connection.

Yet another objective of the invention is to provide an improved method where links, rods, arms, limbs, devices, or something similar can be attached to each other without a fixed physical connection.

Yet another objective of the invention is to provide an apparatus where links, rods, arms, limbs, devices, or something similar can fold onto one another for transporting or storing in a manner as to use the minimal amount of space.

Yet another objective of the invention is to provide an improved method where links, rods, arms, limbs, devices, or something similar can fold onto one another for transporting or storing in a manner as to use the minimal amount of space.

Yet another objective of the invention is to provide an apparatus where links, rods, arms, limbs, devices, or something similar can be nested together to extend the range of supporting links, rods, arms, limbs, devices, or something similar.

Yet another objective of the invention is to provide an improved method where links, rods, arms, limbs, devices, or something similar can be nested together to extend the range of supporting links, rods, arms, limbs, devices, or something similar.

Yet another objective of the invention is to provide a device to allow intelligent linking of links, rods, arms, limbs, devices, or something similar for more flexibility in assembly of an embodiment.

Yet another objective of the invention is to provide a method for intelligent linking of links, rods, arms, limbs, devices, or something similar for more flexibility in assembly of an embodiment.

Yet another objective of the invention is to provide a device/apparatus for conducting electric current through joints or nodes of a device/apparatus that are not physically connected.

Yet another objective of the invention is to provide a method of conducting electric current through joints or nodes of a device/apparatus that are not physically connected.

BRIEF DESCRIPTION OF DRAWINGS

For a more complete understanding of the disclosure, reference should be made to the following detailed description and accompanying drawing figures, in which like reference numerals identify like elements in the figures, and in which:

FIG. 8 illustrates an example node/joint constructed with a non-magnetized surface between;

FIG. 13 illustrates a hypermobile magnetic joint using multiple magnetized ferromagnetic elements inside an enclosed sphere floating freely so as to be able to align the moments of magnetic domains of ferromagnetic elements physically attached to a limb, arm, link, or something similar;

DETAILED DESCRIPTION OF THE INVENTION

Figure 1:
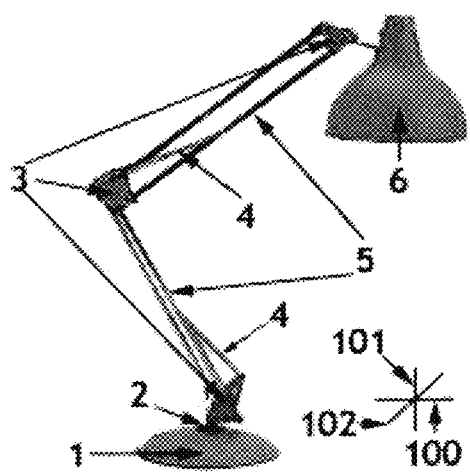
FIG. 1 illustrates a typical adjustable device with a lamp at the end.

Hereinafter, embodiments of the present application are described in detail. However, these embodiments are exemplary, and this disclosure is not limited thereto.

Additionally, the term "steady surface" is intended to imply a steady surface constructed of non-magnetized material, or of non-ferromagnetic material; and includes enclosures since they do have a surface; even when not specifically mentioned.

Ferromagnetism allows certain materials (such as iron) to form permanent magnets or are attracted to magnets. And an element or material that is ferromagnetic has the ability to become magnetized.

The present invention creates a hypermobile magnetic joint by allowing enclosures creating the joint to rotate freely around the other; with ferromagnetic elements inside the enclosures magnetized; the moments of the magnetic domains of the enclosed magnetized ferromagnetic elements aligned parallel to each other inside each enclosure, as well as to the moments of the magnetic domains of the other magnetized ferromagnetic elements inside the other enclosure; with the resulting magnetic attraction/attachment creating frictional forces on the surfaces of the enclosures; maintaining positions of the enclosures, and thus the joint.

The present invention also improves on a method for creating a simple hypermobile magnetic joint where two separate ferromagnetic elements are the primary components in making the joint, by insuring the ferromagnetic element that is not magnetized, is comprised of ferromagnetic elements of a high coercivity.

When a non-magnetized ferromagnetic element is magnetically attached/attracted to another ferromagnetic element that is magnetized, the non-magnetized ferromagnetic element will become magnetized unless its resistance to being magnetized (coercivity) is great. While the non-magnetized ferromagnetic element can rotate around the poles of the magnetized ferromagnetic element when it is not magnetized, it will not be able to as it become magnetized. In other words, it could provide for a simple hypermobile joint until it is magnetized. Once it is magnetized, the moments of the magnetic domains become fixed, and the poles will be established. Their moments will then want to align, but they are not dynamic anymore, and so the non-ferromagnetic element can no longer rotate around the permanently magnetized ferromagnetic element.

A simple hypermobile magnetic joint can be created by taking two separate ferromagnetic elements, one permanently magnetized, and the other demagnetized. The ferromagnetic element that is not magnetized can dynamically align the moments of its domains with the moments of the permanently magnetized ferromagnetic element. This means that while the poles are permanently established for the permanently magnetized ferromagnetic element, they are not permanently established for the non-magnetized ferromagnetic element. Thus, this non-magnetized ferromagnetic element can rotate freely around the poles of the permanently magnetized ferromagnetic element, creating a simple hypermobile joint.

Configurations of the present invention create a super hypermobile, super magnetic joint.

Within this specification, a super magnetic joint is considered to be a magnetic joint where all ferromagnetic elements are magnetized and the moments of their magnetic domains are aligned parallel with each other. And a super hypermobile joint is considered to be a joint where both enclosures comprising the joint can fully rotate around the other, not just one around the other.

The present invention creates a joint where the enclosures creating the joint can rotate around each other in all directions, not just one enclosure around the other, creating super hypermobility. And since all ferromagnetic elements with this invention can be magnetized with the moments of their magnetic domains aligned parallel, magnetic attraction is at a maximum creating a super magnetic joint.

A joint comprised of floating magnetized ferromagnetic element(s) inside a non-ferromagnetic enclosure magnetically attached/attracted to a permanently fixed in position magnetized ferromagnetic element outside the enclosure creates a hypermobile super magnetic joint, but not a super hypermobile, super magnetic joint.

In this case, all magnets are magnetized and the moments of their magnetic domains can align in parallel creating a super magnetic force. But the only place of magnetic attachment/attraction for the permanently fixed ferromagnetic element that comprises one side of the joint is at one of its magnetic poles. Thus, while this can be considered a hypermobile joint, it can't be super hypermobile, because only one component of the joint can rotate around the other.

A joint comprised of floating magnetized ferromagnetic element(s) inside a non-ferromagnetic enclosure magnetically attached/attracted to a permanently fixed in position non-magnetized ferromagnetic element outside the enclosure creates a super hypermobile magnetic joint, but not a super hypermobile, super magnetic joint.

In this case, not all ferromagnetic elements are magnetized so the joint is not super magnetic. But since the fixed ferromagnetic element that comprises a component of the joint is not magnetized; the magnetic attachment/attraction is not limited to its poles. Thus, while it is not super magnetic, it is super hypermobile.

As a component of an embodiment with a ferromagnetic element moves along the axis of a steady surface with another ferromagnetic element on the opposite side, if one of the ferromagnetic elements is magnetized and enters the magnetic field of the other ferromagnetic element (or vice versa), a frictional force is placed against the steady surface on both sides by the ferromagnetic elements after they magnetically attract/attach to each other. This frictional force resists movement and maintains the position of the moved component(s) of the embodiment after movement is complete.

Moving a component of the embodiment is simply a matter of exerting a force on a component greater than the force of friction keeping the components in place on the embodiment.

Figure 2:
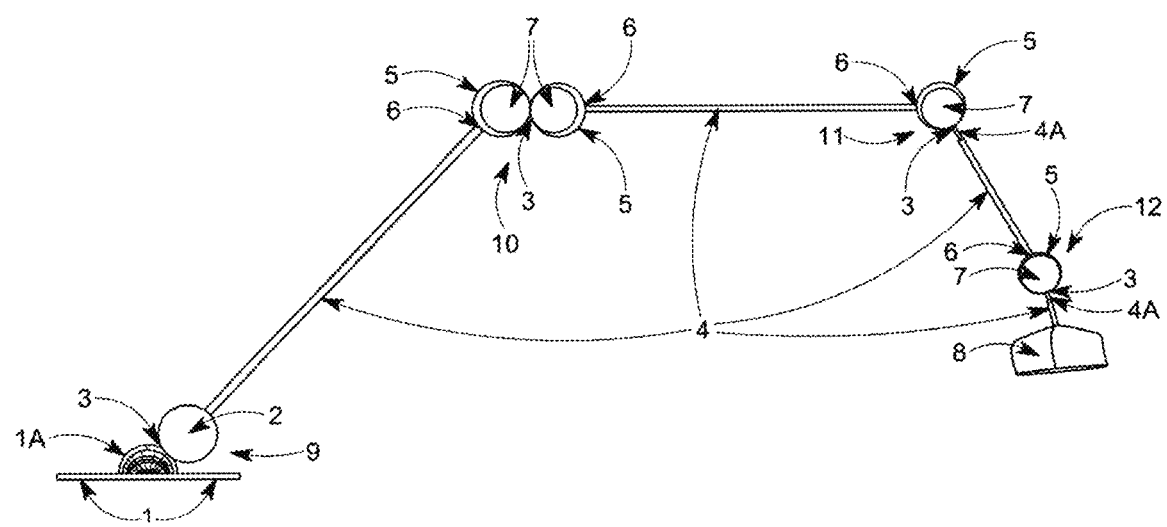
FIG. 2 illustrates an example embodiment utilizing magnetic joints for support of a lamp.

In FIG. 2, we have an example embodiment consisting of a magnetic base joint FIG. 2 (9), consisting of a semi-spherical non-magnetized ferromagnetic element FIG. 2 (1A) physically attached to a surface FIG. 2 (1) and magnetically attached/attracted to a spherical magnetized ferromagnetic element FIG. 2 (2) physically attached at the end of a link, rod, arm, limb, or something similar FIG. 2 (4); a hypermobile, hypermagnetic joint FIG. 2 (10) consisting of enclosures FIG. 2 (5) with floating/unfixed in position spherical magnetized ferromagnetic elements inside FIG. 2 (7) and physically attached FIG. 2 (6) to links, rods, arms, limbs, or something similar FIG. 2 (4); two hypermobile, super magnetic joints FIG. 2 (11) and FIG. 2 (12) consisting of links, rods, arms, limbs, or something similar FIG. 2 (4) with fixed cylindrical embedded ferromagnetic elements FIG. 2 (4A); and a device/apparatus on the end FIG. 2 (8). Devices such as FIG. 2 (8) can be magnetically attached any place along the embodiment that a ferromagnetic element exists.

When a component of the embodiment in FIG. 2 is moved, enclosures FIG. 2 (5) at the end of the links, rods, arms, limbs, or something similar FIG. 2 (4), and/or fixed magnetized ferromagnetic elements FIG. 2 (4A) embedded in links, rods, arms, limbs, or something similar FIG. 2 (4), have to rotate around the enclosure that is completing the joint.

When the joint is comprised of two enclosures, the magnetized ferromagnetic elements inside the enclosure(s) move along the surfaces of their enclosure to maintain alignment of the moments of their magnetic domains and that of the magnetized ferromagnetic elements inside the other enclosure. The frictional forces against the surfaces of the enclosures created by the magnetic attraction/attachment create the joint and support the newly desired position of components of the embodiment.

In FIG. 2, a few of the links, rods, arms, limbs, or something similar FIG. 2 (4) have fixed cylindrical ferromagnetic elements FIG. 2 (4A) at their ends to create a magnetic joint. In this case, the joint and frictional forces result from the magnetic attraction/attachment of; the permanently fixed cylindrical magnetized ferromagnetic element FIG. 2 (4A) at the end of a link, rod, arm, limb, or something similar FIG. 2 (4) on the outside of a single enclosure FIG. 2 (5); and that of a floating magnetized ferromagnetic element FIG. 2 (7) inside this same enclosure.

Daisy chaining magnetized ferromagnetic elements embedded inside links, rods, arms, limbs, or something similar increases their magnetic forces, and thus the frictional force between the ferromagnetic elements and the fixed/steady surface is improved as well. This daisy chaining also increases the weight that can be supported of a component of the embodiment.

It is an objective of the embodiment to be stiff, strong, light in weight, and flexible but precise in placement and positioning.

In practice, it may be well served to use carbon-fiber or a like material for non-ferromagnetic elements, and neodymium, samarium cobalt, or iron nitride where ferromagnetic elements are needed with a high coercivity and strong magnetic force. This allows for superior strength of the components of the embodiment and a minimal "spring" like effect when positioning a component of this apparatus.

While carbon-fiber shows the potential to become magnetized, its coercivity is high enough not to be an issue in this application. And neodymium, samarium cobalt, and iron nitride have a high coercivity for ferromagnetism making them ideal in situations where you do want the behavior of ferromagnetism, but coercivity such that becoming permanently magnetized or de-magnetized without a great degree of resistance is not an issue.

Coercivity is the measurement of the resistance of a magnetic material to changes in magnetism. It refers to the resistance of a magnetized magnet becoming demagnetized, as well as magnetized.

The strength of carbon fiber, and the consistency and accuracy of at least two magnets attached to each other's "moment" affords portable, consistent, precision positioning and alignment of the components of the embodiment at a subatomic level. A magnet's "moment" characterizes the magnet's overall magnetic properties including the direction of its magnetic field.

A magnet consists of "magnetic domains". Think of magnetic domains as miniature magnets making up the whole magnet. When a ferromagnetic (not to be confused with ferrimagnetic) material is magnetized, the moments of these domains line up parallel to each other. The moments of ferromagnets align in parallel due to what is called "exchange interaction" between two localized spins in their atomic structures. The exchange interaction is a quantum mechanical dance in essence that occurs between two identical particles, and in this case, they dance till they become parallel to each other.

You visually see this dance when you place two magnets in proximity to each other as their moments try to become parallel to each other. "identical particles" in this case refers to particles such as electrons, quarks, bosons and fermions that cannot be distinguished from another.

In quantum mechanics, particles are classified as bosons or fermions. All particles with half-integer spin act as fermions, and all particles with integer spin behave as bosons. Bosons can share a quantum state, but fermions cannot. Electrons have ½ spin, and as a result the overall wave function ends up antisymmetric when two electrons are interchanged with respect to both spatial and spin coordinates.

Electrons repel each other and maximize on this distance apart by aligning their spins parallel to each other. As they align their spins with each other, they perform the "dance", creating their poles.

Electrons are fermions, and the alignment of electrons (fermions) parallel to each other in a ferromagnetic element is what magnetizes it creating the North & South poles. Thus, the alignment of the ferromagnetic element(s) can be argued to be aligned at the atomic and even subatomic level.

For precision positioning of a link, rod, arm, limb, or something similar FIG. 2 (4) wanting to be magnetically attached to the base, a non-magnetized ferromagnetic material is used.

A non-magnetized ferromagnetic base FIG. 2 (1A) does not resist the movement of the magnetized ferromagnetic element FIG. 2 (2) at the end of the link FIG. 2 (4), where-by a "magnetized" ferromagnetic base would. A magnetized ferromagnetic base has poles (North & South) already established and permanent, and a non-magnetized ferromagnetic base doesn't. A non-magnetized ferromagnetic base has moments that can be dynamic; meaning the location of the poles is dynamic.

For example, as links, rods, arms, limbs, or something similar with magnetized ferromagnetic elements attached to their ends are moved, the non-magnetized ferromagnetic material's moments of the magnetic domains of the base FIG. 2 (1A) can dynamically move to stay parallel. The base doesn't move or rotate, just the moments of the magnetic domains.

With a magnetized ferromagnetic base, the actual ferromagnetic base would resist rotation since the internal moments of the magnetic domains are already set. This can be an asset in essentially giving the base link support but becomes a liability when you want flexible positioning of the link magnetically attached/attracted to the base.

Portable bases can be kept in place on horizontal, vertical, angled, conductive, as well as non-conductive surfaces. Such as in FIG. 5, embodiments can utilize magnetized ferromagnetic elements FIG. 5 (7) floating inside a non-ferromagnetic enclosure FIG. 5 (5) on a side of a non-magnetized surface FIG. 5 (1); opposite a magnetized ferromagnetic element below the surface FIG. 5 (2); creating a magnetic attraction/attachment, and thus a joint to maintain positioning.

Links, in embodiments, may comprise a hollow thin rod with different shapes of ferromagnetic element(s) on the end and/or inside, depending on application.

Figure 4:
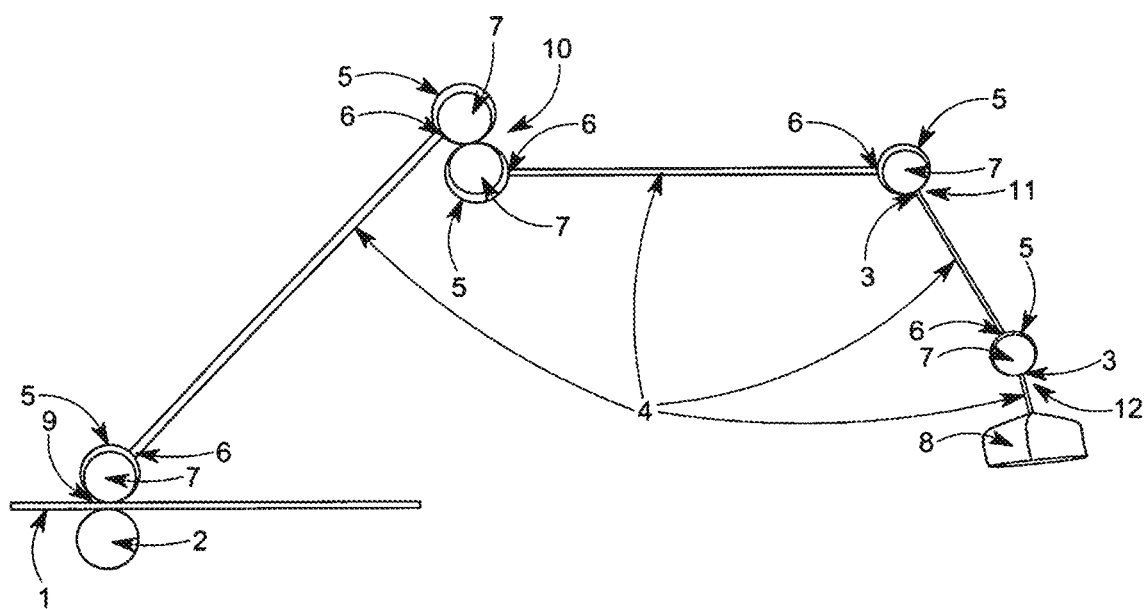
FIG. 4 illustrates an example embodiment demonstrating super mobility at a joint and a fully magnetic base joint.

FIG. 4 shows an example super hypermobile, super magnetic joint FIG. 4 (10), created with side-by-side, dual spherical enclosures FIG. 4 (5); and magnetized spherical magnets FIG. 4 (7) floating inside, magnetically attached/attached to each other.

Magnetized spherical ferromagnetic elements have strict north and south poles, affording an extremely accurate alignment of the moments of the magnetized ferromagnetic elements. It could be argued this alignment is not only atomic, but subatomic as well.

Figure 7:
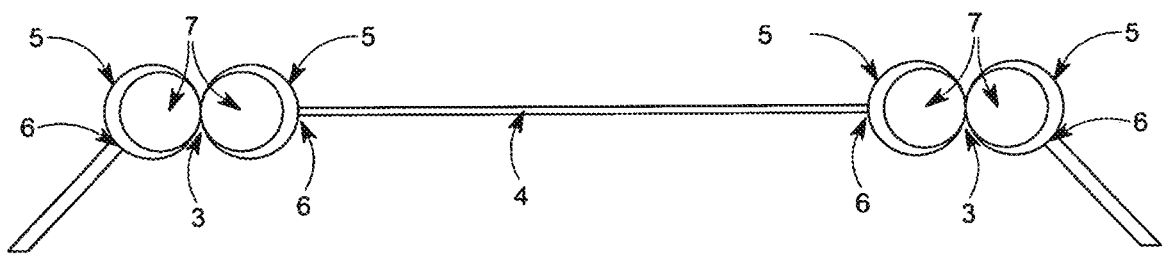

FIG. 7 shows an example embodiment demonstrating super hypermobile, super magnetic joints with the link FIG. 7 (4) having the ability to intelligently re-link to any other ferromagnetic element of the embodiment.

Floating magnets FIG. 7 (7) in both enclosures FIG. 7 (5) of a joint allow for intelligent linking of the joint. As a floating magnet FIG. 7 (7) inside an enclosure FIG. 7 (5) encroaches the event horizon or magnetic field of another in a different enclosure, the torque applied to each of them causes their "dance" with one another rotating them so the moments of their magnetic domains can align parallel and then magnetically be attached/attracted to each other.

Consider in this example the "event horizon" to be the point at which a magnet can leave the magnetic field of another; the "point of no return", or vice versa.

Links come in different lengths and widths. In embodiments, links and enclosures can be threaded for physical joints to connect together for custom lengths when needed.

The two components (sides of a magnetic joint) can come in several types and shapes. Some examples are: component is an enclosure with floating ferromagnetic element(s) non-magnetized inside; component is an enclosure with floating ferromagnetic element(s) magnetized inside; component is a fixed non-magnetized element; component is a fixed magnetized element; component is an enclosure with daisy chained magnets to add magnetic strength to the enclosure. Enclosures can be of many shapes with minimum dimensions allowing for floating magnet(s) to move freely inside. Enclosures can be permanently shaped or flexible.

As is the case with the base, magnetized ferromagnetic fixed element(s) on both ends of attaching links, rods, arms, limbs, or something similar will always try to align at their fixed poles since the moments of the magnetic domains are fixed and trying to align parallel. Since the magnetized ferromagnetic element(s) are fixed in position, the position of the links with respect to each and the base also stays fixed. This type of a joint does not provide flexible/adjustable positioning.

For the purposes of this specification, a flexible enclosure is intended to mean one that is not fixed in dimensions. It can be assembled to create alternative shapes.

A flexible enclosure can be pulled apart, slid, or twisted apart depending on its shape. A flexible enclosure can be two semi-spheres twisted together at their equators, or even snapped together. Other shapes can be designed such that they can be pulled apart to change internal configurations of the ferromagnetic elements.

An enclosure that is a semi-sphere on one-side, and then slightly concave on the other affords great flexibility. Rotating the enclosure 180 degrees completes the need for a full 360-degree rotation. And remember, the magnetized ferromagnetic elements inside enclosures can rotate around their poles which means moving one does not affect the other. So, rotating an enclosure with a semi-sphere on one side to have the other 180 degrees available does not affect anything attached to it if the attachment is held in place during the rotation.

Flexible enclosures come in handy when a joint isn't strong enough to support a device, and a larger magnet inside an enclosure can solve the problem. Remember magnets are unique in that they can hold many times their own weight. So, while adding a larger magnetized ferromagnetic element to an enclosure could appear to make it harder to support a device at the end of the embodiment, depending on the location of this added magnetized ferromagnetic element to a joint, the actual weight that can be supported of a device at an end of an embodiment can increase. The additional weight is offset by the fact magnets can support many times their own weight.

Depending on how far out from the base a larger magnet was added to an enclosure, larger magnets will often need to be added to the enclosures of preceding joints to support their additional weight.

In other words, the heavier the magnets, the more they can support depending on the type of ferromagnetic material they are composed of, and their location in the apparatus. So, in the end, flexible enclosures afford different magnetic configurations inside to accomplish different tasks, and different shapes offer the ultimate flexibility.

Another benefit of using carbon fiber or a like material for the purpose of constructing all the non-ferromagnetic elements/components of the apparatus is the flexibility of forming a component of the apparatus. Components of a node can be enclosures that are spherical, square, semi-spherical, triangular, concave, and convex, surfaces that are planer; or pretty much any shape desired. Even links and bases can be of different shapes for different tasks. For example, there may be a need for a link/connecting rod that is curved. This can be easily accomplished with carbon fiber or a like material.

Intelligent linking allows a link to be automatically attached/attracted to another magnetically creating a joint, without having an impact on another attaching link. If an enclosure contains unfixed/free floating magnetized ferromagnetic elements in inside, the free floating ferromagnetic elements will automatically rotate for the moments of their magnetic domains to be parallel with the others.

Figure 6:
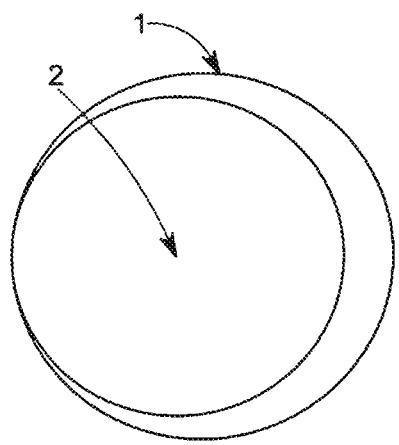
FIG. 6 illustrates a blown-up view of an example partial joint of an embodiment; containing floating magnetized spherical ferromagnetic elements forming a typical super hypermobile, super magnetic joint, and intelligent link.

For example, in FIG. 6, we have a typical spherical enclosure FIG. 6 (1) with a spherical magnetized ferromagnetic element inside FIG. 6 (2). As you can see, the diameter of the spherical magnetized ferromagnetic element inside FIG. 6 (2) is smaller than the diameter of the enclosure FIG. 6 (1). This allows the ferromagnetic element FIG. 6 (2) to rotate freely inside the enclosure FIG. 6 (1). In an actual completed device/apparatus, the size of the enclosure needs to be just enough larger in size than the enclosed ferromagnetic material to still allow it to move freely.

In FIG. 7, we have a link/rod FIG. 7 (4) with spherical physically attached enclosures on both ends FIG. 7 (5), and floating magnetized ferromagnetic spheres inside FIG. 7 (7). Since the magnetized ferromagnetic spheres can move freely, this link could be removed from the embodiment shown in FIG. 7, flipped, rotated, and moved in any manner, and the floating magnetized ferromagnetic spheres inside each of the fixed enclosures will rotate on their axes to align their moments with the other when re-attaching the link. This is referred to as intelligent linking, when the internal ferromagnetic elements can align themselves automatically or intelligently such that their moments can be aligned parallel.

Smooth surfaces provide for the most accurate positioning since ferromagnetic elements magnetically attached/attracted to the surfaces on both sides of an enclosure with a course surface may move after a force being applied is removed.

Flexible enclosures can be designed to enhance the overall strength of the magnetic field by allowing internal daisy-chained magnetized ferromagnetic elements. The natural effect of two magnetic fields coming together aligns their magnetic domains parallel to each other and adds to their overall strength.

Figure 8:
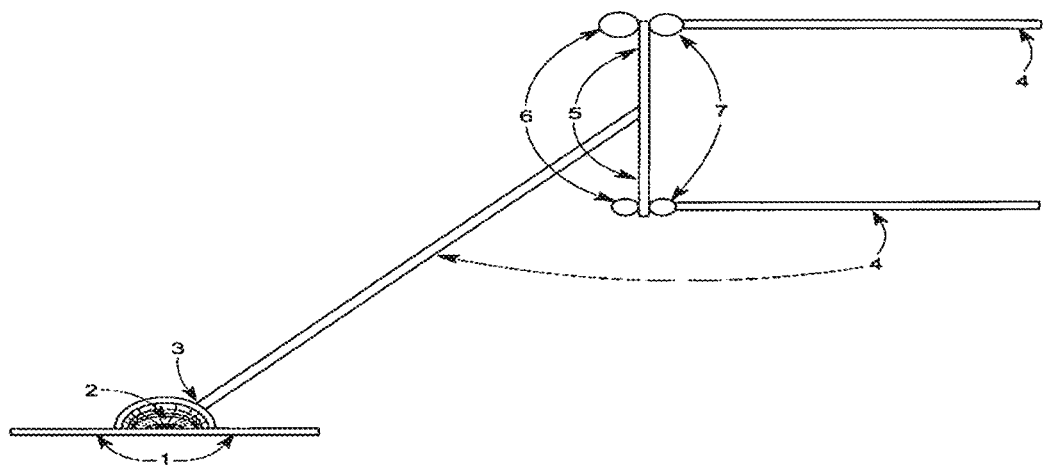
Figure 9:
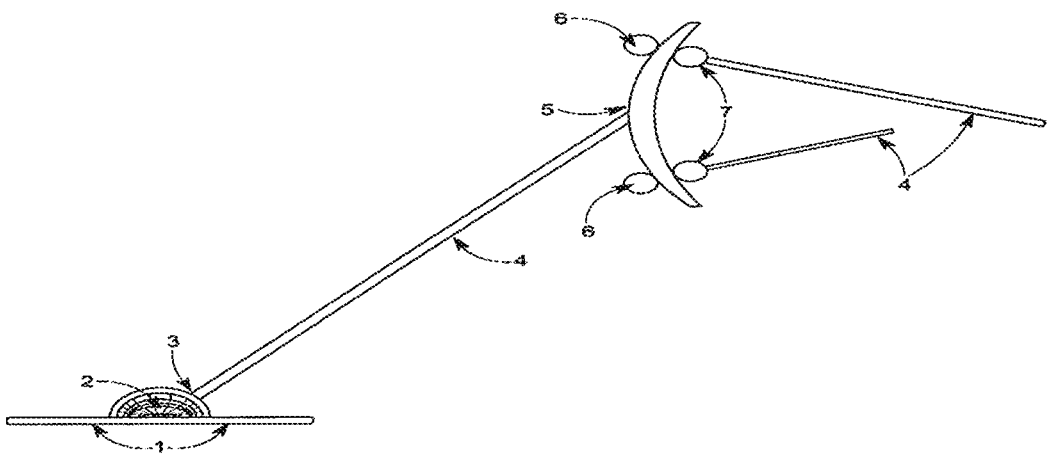
FIG. 9 illustrates an example node/joint constructed of a plane curve.

FIG. 8 (5) shows a sample node that is a plane. FIG. 9 (5) shows a node that is a plane curve. If the node is a planeorplane curve, then the un-fixed ferromagnetic element(s) FIG. 8 (6) or FIG. 9 (6), opposite the link/rod ferromagnetic elements FIG. 8 (7) or FIG. 9 (7) on the other side of the plane, create the magnetic node.

If the node material is non-magnetized ferromagnetic material, the nodes magnets FIG. 8 (6) and FIG. 9 (6) can be placed most anywhere on either side of the plane opposite the link magnet ferromagnetic elements FIG. 8 (7) or FIG. 9 (7). This is because their moments are not fixed.

Figure 10:
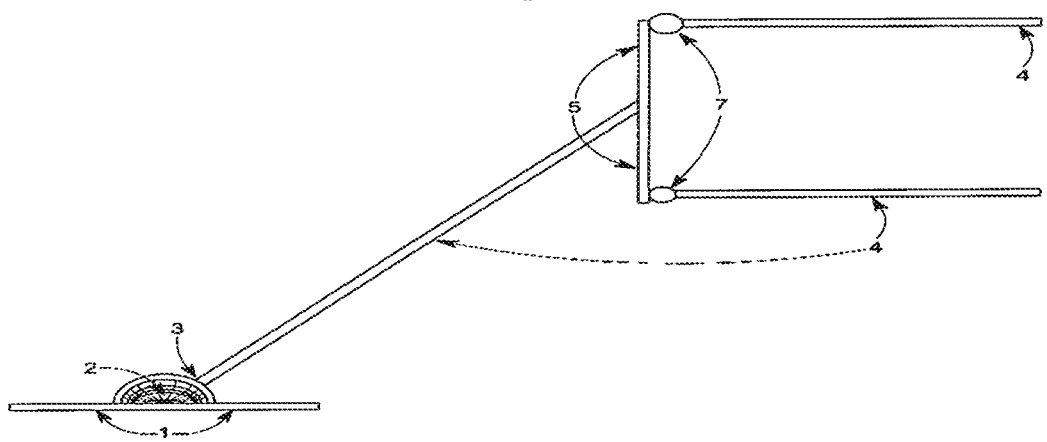
FIG. 10 illustrates an example node/joint constructed of a magnetized surface in the shape of a plane.

If the ferromagnetic material of the attaching tip of a link is magnetized FIG. 10 (7), it can attach directly to a plane FIG. 10 (5) made out of ferromagnetic material.

A plane made of ferromagnetic material that is magnetized will cause the attaching magnets to attach at the edges, center, or where the other "moments" of the magnetic domains are of the plane. This is because the plane does have fixed magnetic moments and so the magnet's moments will want to align parallel with one of the magnetic moments of the plane. The poles are the places the ferromagnetic material attached to the rod/link will want to connect to the plane.

Enclosures and/or surfaces made of Carbon fiber or something similar create a natural skin like effect enhancing the friction to maintain positioning. And finally, enclosures with small dimples/small spherical holes allow the attracting ferromagnetic material to maximize on their magnetic forces because the magnets are able to actually touch each other.

Magnets lose their attracting strength with each other quickly when the distance between increases, so allowing the magnets to actually touch each other maximizes their strength in supporting an apparatus.

Another advantage of the "holed" surface is that an electric current can pass from the base to a link and node, providing power to a device with direct connectivity.

Since one of the challenges for a magnet is to support weight, grooves on the surface of a sphere perpendicular and as much horizontal as possible to the connecting rod/link can actually be a locking mechanism for the attached/attracted link. In this case, the "hills" can be sharp edges, or even angled such that to move down to another groove, the magnet has to move not only away from the other magnet, but also out temporarily. This doesn't afford the greatest in accuracy of positioning but adds considerable resistance to movement.

Enclosures can have a retaining vacuum, or a gas such as helium to assist in its weightlessness.

Placing a pod with ferromagnetic material any place on a component of the embodiment where there is magnetized ferromagnetic material allows not only multiple places for attaching devices/apparatuses, but also affords multiple devices/apparatuses to be attached.

Figure 11:
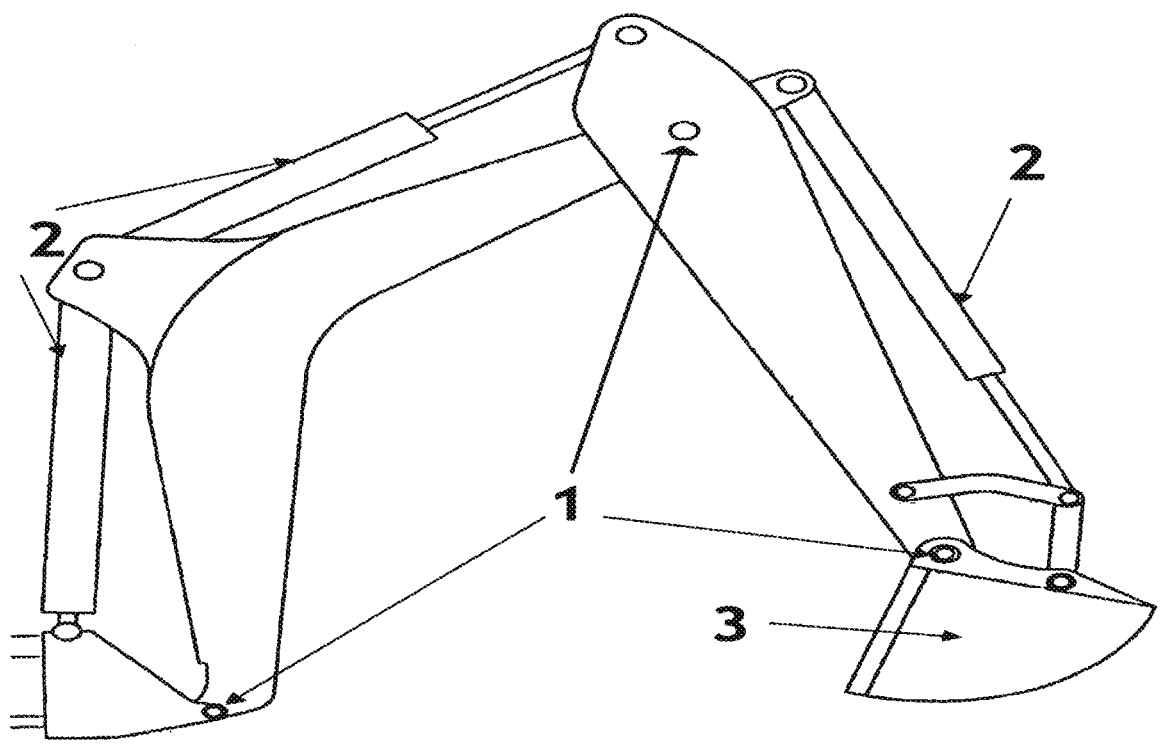
FIG. 11 illustrates a typical backhoe attachment.

FIG. 11 illustrates a typical back hoe device. The objective of the components of the back hoe is to be able to manipulate the bucket FIG. 11 (3). Hydraulic cylinders FIG. 11 (2) operate in a single dimension to provide movement by pivoting at the joints FIG. 11 (1). Movement of the bucket FIG. 11 (3) is accomplished by the hydraulic cylinders working together harmoniously.

Figure 12:
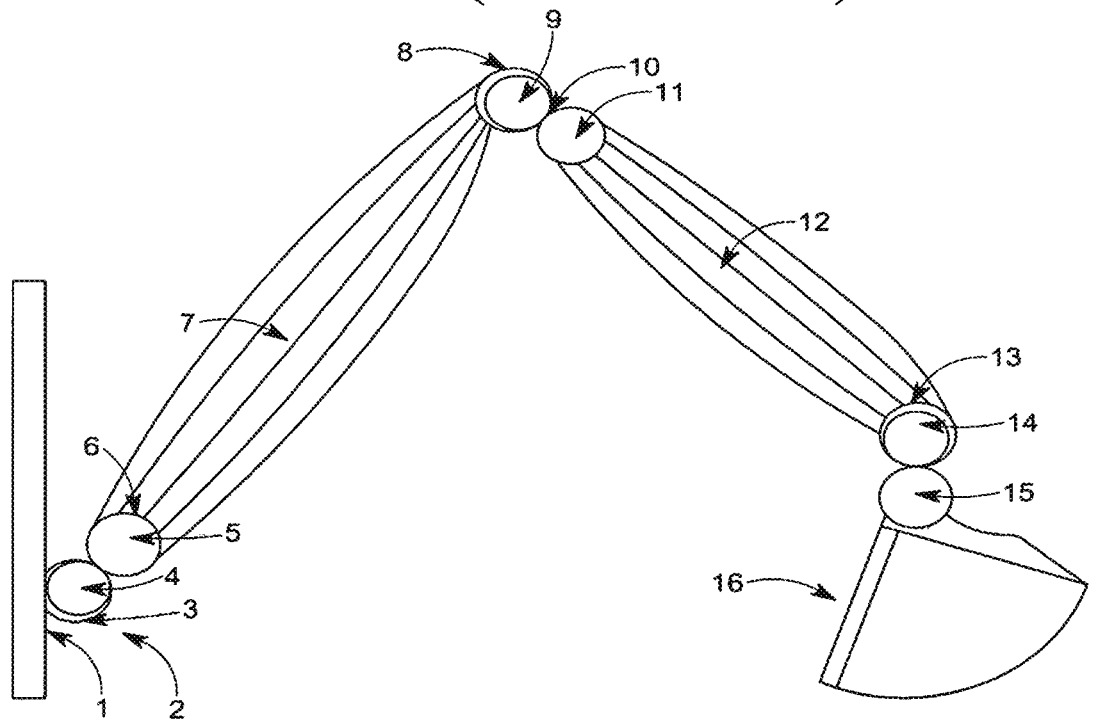
FIG. 12 illustrates a backhoe using hypermobile, super magnetic joints.

FIG. 12 illustrates an example embodiment replacing mechanical and hydraulic components of a back-hoe device with hypermobile, super magnetic joints.

FIG. 12 (2) is an example hypermobile, super magnetic component of a joint with an enclosure FIG. 12 (3) constructed of non-ferromagnetic material or non-magnetized ferromagnetic material and a permanently magnetized ferromagnetic element inside the enclosure FIG. 12 (4) free to rotate on its axis.

FIG. 12 (5) is a permanently magnetized ferromagnetic element physically attached FIG. 12 (6) to boom FIG. 12 (7) of the back hoe. FIG. 12 (5) is magnetically controlled by the permanently magnetized ferromagnetic element FIG. 12 (4), floating inside the enclosure FIG. 12 (3) that is physically attached to the mounting plate.

FIG. 12 (8) is again a spherical enclosure constructed of non-ferromagnetic material or non-magnetized ferromagnetic material with a permanently magnetized ferromagnetic element FIG. 12 (9) inside, mobile and free to rotate.

FIG. 12 (11) is a permanently magnetized ferromagnetic element physically attached to the dipper FIG. 12 (12) of the back-hoe and magnetically controlled by the permanently magnetized ferromagnetic element FIG. 12 (9). If the magnetized ferromagnetic element FIG. 12(9) inside the enclosure FIG. 12 (8) of the boom FIG. 12 (7) moves, the dipper moves as well so as to allow for the moments of the magnetic domains to continue to align with one another where the magnetic fields meet FIG. 12 (10).

FIG. 12 (13) is also a non-ferromagnetic element or a non-magnetized ferromagnetic element with a permanently magnetized ferromagnetic element inside FIG. 12 (14) free to rotate on its axis. As the permanently magnetized ferromagnetic element FIG. 12 (14) is rotated on its axis, the ferromagnetic element FIG. 12 (15) moves as well so as to keep the moments of the magnetic domains aligned. As the ferromagnetic element FIG. 12 (15) moves, the bucket FIG. 12 (16) which is physically attached to the ferromagnetic element FIG. 12 (15) moves accordingly.

The invention configured in FIG. 12 provides for multiple components to be able rotate with hypermobile capability. In other words, movement is not limited to a single axis at a particular component of the joint.

For example, the dipper FIG. 12 (12) has the ability to rotate about the joint where the dipper and boom are magnetically attached/attracted to each other at a 90-degree angle. This provides access for the bucket of a back hoe to reach places never possible before. It can dig at a location around a corner that it can't even visualize.

Permanent magnets have established poles and can thus be controlled and manipulated by an electric field. To manipulate the components of the embodiment in FIG. 12 (12), an electric field can be applied to the permanently magnetized elements inside the enclosures. Control of the permanent magnetic elements inside the enclosures, and thus the boom, dipper, and bucket of the back-hoe device can be manipulated by controlling the direction and intensity of electric fields applied to the permanent magnet magnetic fields.

These electric fields can be controlled wirelessly providing for remote operation.

Figure 13:
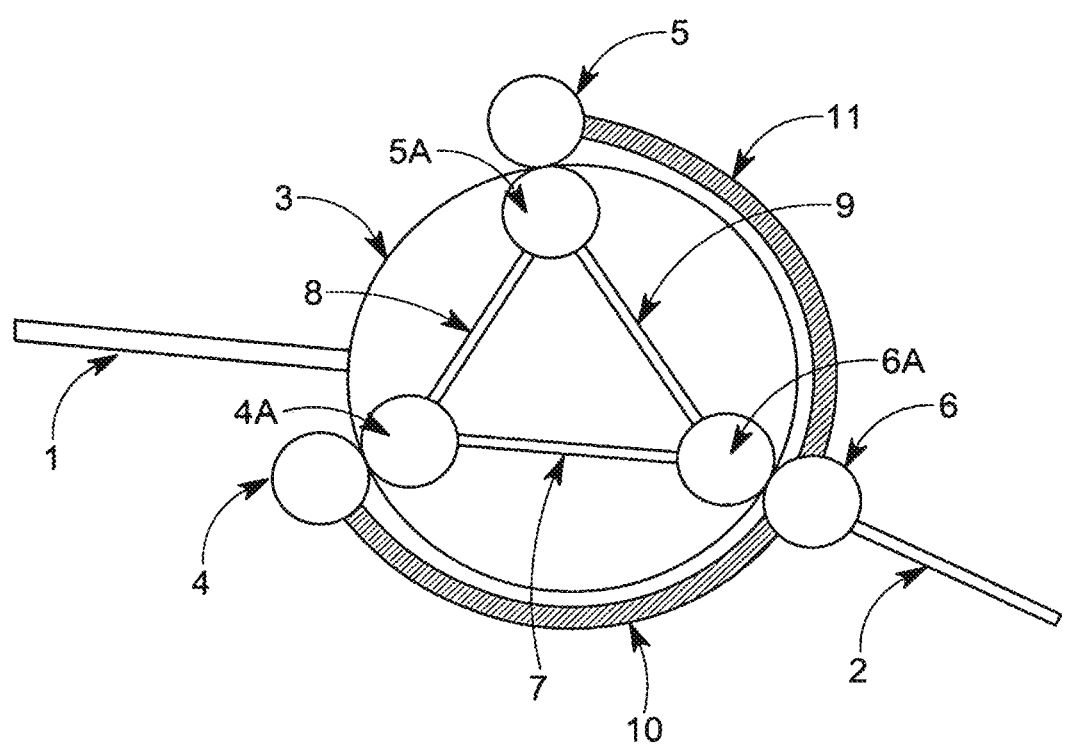

FIG. 13 illustrates an example embodiment with multiple ferromagnetic elements internal to a spherical enclosure and physically attached to each other to eliminate their magnetic fields from effecting the other; and ferromagnetic elements external to the enclosure of the embodiment and attached to a link, rod, arm or something similar.

As a component of the embodiment is moved, the ferromagnetic elements that are physically attached to the link, rod, arm or something similar rotate to allow this movement. With the internal ferromagnetic elements free to rotate as an assembly, magnetic attraction/attachment can be accomplished with the ferromagnetic elements external to the enclosure.

As the link, rod, limb, or something similar FIG. 13 (2) is moved in position relative to the enclosure FIG. 13 (3), the ferromagnetic elements (FIG. 13 (4), FIG. 13 (5), and FIG. 13 (6)) physically attached (FIG. 13 (10), and FIG. 13 (11)) to the link, rod, arm, or something similar FIG. 13 (2) rotate causing the internal magnetized ferromagnetic elements (FIG. 13 (4A), FIG. 13 (5A), and FIG. 13 (6A)) physical attached to each other (FIG. 13 (7), FIG. 13 (8), and FIG. 13 (9)) to rotate as well inside the enclosure. The friction at the three different points against the surface of the enclosure from the magnetic elements magnetically attracted/attached to each other maintains the alignment after movement of a component.

Providing more limbs with ferromagnetic elements on the inside of the enclosure as well as the outside improves strength and stability of the embodiment.

Components of an Example Embodiment could be:

A pod; referred to as an apparatus or device attached to a component of the embodiment to control, support, hold, or temporarily place other devices or items needed for a task. A typical example would be to provide precision lighting to a work area, or photo/video editing. Or in the large-scale case, a bucket attached to the last arm of a backhoe;

Attachments; any item that could be attached to a pod for a task, including cameras, lights, tools support trays;

Ferromagnetic elements/materials, both magnetized and non-magnetized;

Spherical magnets; providing for an ideal floating magnet in that they can torque around dead center, don't break apart so easily, and the focus of their magnetic forces is at their apexes when being attracted to another spherical magnet. This allows for repetitive alignment at an atomic and possibly subatomic level;

Cylindrical magnets can work well and exist internal in a link/rod. A limiting factor to cylindrical magnets is that adding more cylinders adds to the overall strength of the ferromagnetic material, but only proportional up to the point the length equals the diameter. At that point adding more adds strength at a smaller rate;

Ferrofluid is a liquid that can behave like a magnet when in the presence of an electric or magnetic field but goes back to a fluid when not. It is made from tiny magnetic particles coated with a surfactant that prevents magnetic particles from clumping together. The advantage to Ferrofluid is that it can shape itself to maximize on matching the moments of the invading magnetic field, giving it great strength. To the negative, surfactant on each of the tiny particles retards the magnetic strength as their moments align with each other, and it can be dangerous if an enclosure creates a leak.

Custom shaped magnets are ideal when accuracy is less of a concern over strength. Forging magnets that have shapes to match internal and externals surface dimensions can provide for a stronger magnetic connection, depending on their shapes;

For links, rods, arms, limbs, or something similar with permanently fixed enclosures, a screw can be used to connect the enclosure to the link. Using a screw made of ferromagnetic material screwed through the enclosure and fixed to a link provides a strong natural "home base' for the floating magnet. When the links, rods, arms, limbs, or something similar aren't being used, the magnet sits magnetically attached to this screw in the enclosure.

When the ferromagnetic elements of a link leave the event-horizon of the magnetized ferromagnetic element inside an enclosure, the magnet dynamically tries to magnetically attach to the screw or "base". This is convenient for storage or transporting the devices, making them silent. For the most part, the floating magnets make no noise while transporting components since they are magnetically attached to the screw, or magnetically attached to another rod/links ferromagnetic material;

Enclosures and links can be permanently molded in a material such as carbon fiber:

The assembly of a device is simply mounting a base; moving a link with-in the event horizon of a bases magnetic field; placing a magnetized ferromagnetic element inside an enclosure with-in the event horizon of the link's other magnetic field; repeating the process; and then moving a pod with-in the event horizon of the last link or enclosures magnetic field and letting it attach. Add other links for multiple pods;

The operation of an example device is as follows:

Mount the base either permanently or fixed, and simply move a component of the embodiment and it stays fixed. Place a camera, light, device or item needed on any magnetic part for a task. Share a node with other links or pods to have other pods for other tasks supported off a single base.

Depending on the application and environment, the base can be a standard non-magnetic link and node, with the last link as a magnetic link and pod. Or the base can be magnetic, and the last link and pod are standard attachment. This affords flexible positioning with reasonable precision.

Some aspects of the systems may include:

The friction created by placing a steady surface between two attracting magnets for maintaining placement and positioning of a device or pod;

The use of two spherical attracting magnets, or one spherical magnet and a non-magnetized spherical ferromagnetic element for precision alignment at an atomic level;

Use of links/rods with fixed enclosures and floating magnetized ferromagnetic elements inside the enclosures for automatic positioning of an object. When a magnet in an enclosure is put into the magnetic field of another magnet, the "torque" of one can be used to position the other;

A floating magnet in both ends of a link/rod allowing for intelligent magnetic attachment;

A magnetic home base;

The use of carbon fiber with a high coercivity to magnetism;

The ability to control, support or provide a pod or device with no physical connection to any supporting structure;

Use of two magnets with a non-ferromagnetic surface between them for a base of an apparatus;

Dimpled or corrugated enclosures for added friction creating a joint;

Use of spherical magnets because of their ability to intelligently polarize themselves in position to other magnets;

Multiple pods on one base;

Daisy chaining;

Magnetic propagation;

Use of a magnet field to create resistance of movement of another in positioning;

Variable width between the inner and outer shell of the base for an under the counter magnet to add to the overall vertical resistance of the link to move on the base shell;

Adjusting mechanism to control the repelling force of the two magnets to maintain alignment. A hollowed out non-magnetic device that as rotated "screws" the magnet away in measurable quantities;

Use of a semi-sphere, cone, or concave surface between two opposing magnetized ferromagnetic elements to control and create atomic positioning of two opposing magnets. Normally control of two positioning magnets is impossible;

Smooth surface sphere for precise positioning;

Dimpled magnet matching resolution of dimpled sphere wrapper;

Dimpled surface for measurable positioning. Movement is done in discrete measurable movements;

Use of a gyro to maintain horizontal/vertical positioning of the base;
Hollowed out chromium spheres for enclosures;

EXAMPLES

In the following examples, ferromagnetic elements are considered to be neodymium, samarium cobalt, iron nitride, or that of magnets with extremely hi coercivity and ability to generate and retain extremely high magnetic fields.

FIG. 2 shows an example embodiment with a hypermobile magnetic joint FIG. 2 (9); a super hypermobile, super magnetic joint FIG. 2 (10); and two hypermobile, super magnetic joints FIG. 2 (11) and FIG. 2 (12).

The base magnetic joint referenced by FIG. 2(9) in FIG. 2 is created by two separate ferromagnetic elements (FIG. 2 (1A) and FIG. 2 (2)) being magnetically attached/attracted to each other, but only ferromagnetic element FIG. 2 (2) is permanently magnetized. This means the joint is not a super magnetic joint.

If the base ferromagnetic element FIG. 2 (1A) was also permanently magnetized, its magnetic poles would be fixed, and the joint would then be a super magnetic joint. But permanently magnetized ferromagnetic element FIG. 2 (2) would not then be able to freely rotate around FIG. 2 (1A) allowing flexibility in movement, so it would no longer be a hypermobile joint.

The super hypermobile, super magnetic joint referenced by FIG. 2 (10) is created by two spherical magnetized ferromagnetic elements FIG. 2 (7) magnetically attached/attracted to each other creating the magnetic joint. In this case, both spherical ferromagnetic elements FIG. 2 (7) are permanently magnetized, and thus the resulting magnetic joint created from their magnetic attachment/attraction to each other creates a super magnetic joint.

In addition, both permanently magnetized ferromagnetic elements FIG. 2 (7) creating the magnetic attraction/attachment are freely floating in enclosures FIG. 2 (5). This allows for the enclosures to freely rotate around each other while still allowing the magnetized ferromagnetic elements inside to rotate and keep the moments of their magnetic domains aligned parallel.

Keeping the moments of the magnetic fields of the ferromagnetic elements of both enclosures aligned parallel is key to maintaining the magnetic attraction/attachment and thus the magnetic joint. In this case, the ability for the enclosures to rotate around each other provides for super hypermobility. The joint FIG. 2 (10) thus is a super hypermobile, super magnetic joint.

The joints referenced by FIG. 2 (11) and FIG. 2 (12) are created by spherical magnetized ferromagnetic elements FIG. 2 (7) floating freely inside spherical enclosures FIG. 2 (5); and cylindrical magnetized ferromagnetic element(s) FIG. 2 (4A) embedded in links FIG. 2(4) at their ends; magnetically attracted/attached to each other. With all ferromagnetic elements magnetized, the magnetic joint becomes a super magnetic joint. However, the cylindrical ferromagnetic element(s) are fixed and not free to rotate on their axis(s). And so, while the enclosures FIG. 2 (5) are free to rotate for a magnetic attraction/attachment anywhere on their surfaces with other cylindrical magnetized ferromagnetic elements, the only location the cylindrical magnetized ferromagnetic element(s) will have a magnetic attachment/attraction are at the location of their fixed poles.

In FIG. 2, you simply move a component of the embodiment to a newly desired position, and the magnetic joints FIG. 2 (9), FIG. 2 (10), FIG. 2 (11), and FIG. 2 (12) adjust themselves magnetically to retain that position.

Figure 3:
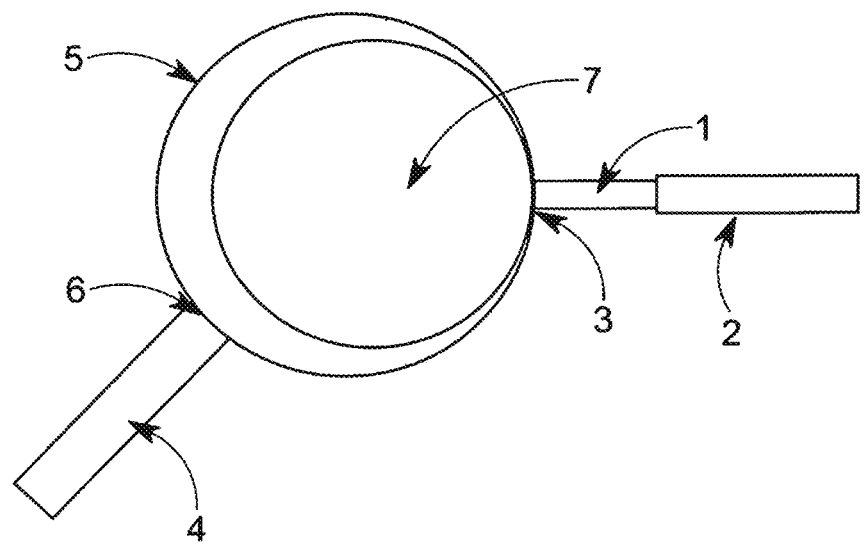
FIG. 3 illustrates a blown-up view of a hypermobile, super magnetic joint of an embodiment.

FIG. 3 shows an example embodiment with a hypermobile, super magnetic joint. Both the spherical ferromagnetic element FIG. 3 (7) and the cylindrical ferromagnetic element FIG. 3 (1) are permanently magnetized. Thus, the joint is super magnetic. The joint it is not super hypermobile since only the spherical magnetized ferromagnetic element has freedom to rotate around the other.

FIG. 4 shows an example embodiment with hypermobile, super magnetic joints FIG. 4 (9), FIG. 4 (11), and FIG. 4 (12); and a super hypermobile, super magnetic joint FIG. 4 (10). The positions of the enclosures FIG. 4 (5) relative to each other on the magnetic joint FIG. 4 (10) demonstrate the super hypermobile nature of the possible magnetic attachments/attractions.

Figure 5:
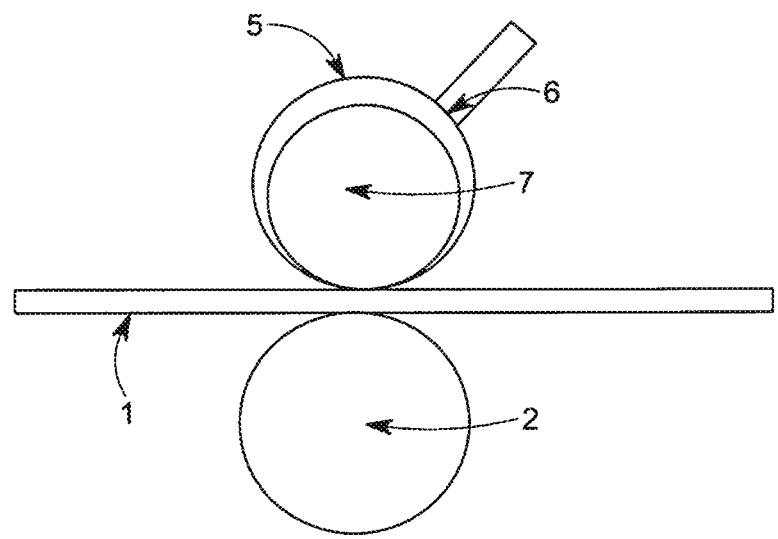
FIG. 5 illustrates a blow-up of a hypermobile magnetic base joint of FIG. 4 with magnetized ferromagnetic elements on both sides of a non-ferromagnetic surface to maintain position of the embodiment.

FIG. 5 shows an example base embodiment with a spherical magnetized ferromagnetic element FIG. 5 (2); magnetically attracted/attached to another free floating spherical magnetized ferromagnetic element FIG. 5 (7) inside a spherical enclosure FIG. 5 (5); with a surface between creating a hypermobile, super magnetic joint.

FIG. 7 shows an example embodiment demonstrating intelligent linking and super hypermobile, super magnetic joints. FIG. 7 shows physically attached spherical enclosures FIG. 7 (5) on both ends of links, rods, arms, limbs, or something similar FIG. 7 (4). Spherical magnetized ferromagnetic elements FIG. 7 (7) are free floating inside the fixed enclosures FIG. 5 (5), and able to dynamically rotate on their axis's aligning the moments of their magnetic domains parallel with each other intelligently, creating magnetic attachment/attraction and an intelligent, super magnetic joint. With all components free floating inside enclosures, each enclosure is able to rotate around the other creating super hypermobility, and thus super hypermobile, super magnetic joints. Removing the link, rod, arm, limb, or something similar FIG. 7 (4); rotating it, flipping it, and then bringing the ferromagnetic element(s) FIG. 7 (7) inside the enclosures FIG. 7 (5) with-in the magnetic field of others will intelligently re-link the joints.

FIG. 8 shows an example with a plane as the node of the embodiment.

FIG. 9 shows an example with a plane curve as the node of the embodiment.

FIG. 10 shows an embodiment with a plane that is magnetized as the node.

FIG. 12 shows an example back-hoe embodiment utilizing hypermobile, super magnetic joints.

FIG. 13 shows an example hypermobile magnetic joint utilizing multiple magnetic elements both inside and outside an enclosure, with the resulting magnetic attraction/attachment to each other providing for additional support of a device/apparatus.

What is claimed:
1. A joint apparatus comprising:
 a first link having first and second ends, the first link further comprising:
  a first spherical enclosure attached to said first end of said first link;
  a first spherical magnetized ferromagnetic element unfixed in position with freedom of movement and confined within said first spherical enclosure of said first link such that the first spherical magnetized ferromagnetic element is configured to move along an inner surface of the first spherical enclosure to facilitate alignment of moments of magnetic domains of the first spherical magnetized ferromagnetic element;
a second spherical magnetized ferromagnetic element attached to said second end of said first link;
a steady surface constructed of non-magnetized ferromagnetic material or of non-ferromagnetic material and having first and second sides;
a third element comprising a semi-spherical ferromagnetic element attached to the first side of said steady surface and magnetically attached to said second spherical magnetized ferromagnetic element within a magnetic field of said second spherical magnetized ferromagnetic element;
wherein the first link is configured to be attachable to the third element, such that the first spherical magnetized ferromagnetic element will rotate inside the first spherical enclosures to align the moments of magnetic domains with the third element when attaching the link thereto.

2. A joint apparatus comprising:
a first link having first and second ends, the first link further comprising:
  a first spherical enclosure attached to said first end of said first link;
  a first spherical magnetized ferromagnetic element un-fixed in position with freedom of movement and confined within said first spherical enclosure of said first link such that the first spherical magnetized ferromagnetic element is configured to move along an inner surface of the first spherical enclosure to facilitate alignment of moments of magnetic domains of the first spherical magnetized ferromagnetic element;
  a second spherical enclosure attached to said second end of said first link;
  a second spherical magnetized ferromagnetic element un-fixed in position with freedom of movement and confined within said second spherical enclosure of said first link;
a steady surface constructed of non-magnetized ferromagnetic material or of non-ferromagnetic material and having first and second sides;
a third spherical magnetized ferromagnetic element located on the second side of the steady surface magnetically attached to said second spherical magnetized ferromagnetic element within a magnetic field of said second spherical magnetized ferromagnetic element such that the second spherical magnetized ferromagnetic element is configured to move along an inner surface of the second spherical enclosure to facilitate alignment of moments of magnetic domains of the second spherical magnetized ferromagnetic element and the third spherical magnetized ferromagnetic element;
wherein the first link is configured to be rearranged, such that the first and second spherical magnetized ferromagnetic elements will rotate inside the first and second spherical enclosures, respectively, to align the corresponding moments of magnetic domains of the first or second spherical magnetized ferromagnetic elements with the third spherical magnetized ferromagnetic element when attaching the first link thereto.

3. A joint apparatus comprising:
a first link having first and second ends, the first link further comprising:
  a first spherical enclosure attached to said first end of said first link;
  a first spherical magnetized ferromagnetic element un-fixed in position with freedom of movement and confined within said first spherical enclosure of said first link such that the first spherical magnetized ferromagnetic element is configured to move along an inner surface of the first spherical enclosure to facilitate alignment of moments of magnetic domains of the first spherical magnetized ferromagnetic element;
  a second spherical enclosure attached to said second end of said first link;
  a second spherical magnetized ferromagnetic element un-fixed in position with freedom of movement and confined within said second spherical enclosure of said first link such that the second spherical magnetized ferromagnetic element is configured to move along an inner surface of the second spherical enclosure to facilitate alignment moments of magnetic domains of the second spherical magnetized ferromagnetic element;
a second link having first and second ends, the second link further comprising:
  a third spherical enclosure attached to said first end of said second link;
  a third spherical magnetized ferromagnetic element un-fixed in position and with freedom of movement within said third enclosure of said second link second such that the third spherical magnetized ferromagnetic element is configured to move along an inner surface of the third spherical enclosure to facilitate alignment of moments of magnetic domains of the third spherical magnetized ferromagnetic element;
  a fourth spherical enclosure attached to said second end of said second link;
  a fourth spherical magnetized ferromagnetic element un-fixed in position with freedom of movement and confined within said fourth spherical enclosure of said second link such that the fourth spherical magnetized ferromagnetic element is configured to move along an inner surface of the fourth spherical enclosure to facilitate alignment of moments of magnetic domains of the fourth spherical magnetized ferromagnetic element;
wherein the first and second links are configured to be rearranged, such that the first, second, third, and fourth spherical magnetized ferromagnetic elements will rotate inside their respective spherical enclosures to align corresponding moments of magnetic domains when attaching the first and second links to one another.

4. A joint apparatus comprising:
a first link having first and second ends, the first link further comprising:
  a first spherical enclosure attached to said first end of said first link;
  a first spherical magnetized ferromagnetic element un-fixed in position with freedom of movement and confined within said first spherical enclosure of said first link such that the first spherical magnetized ferromagnetic element is configured to move along an inner surface of the first spherical enclosure to facilitate alignment of moments of magnetic domains of the first spherical magnetized ferromagnetic element;
a second spherical enclosure attached to said second end of said first link;
a second spherical magnetized ferromagnetic element un-fixed in position with freedom of movement and confined within said second spherical enclosure of said first link such that the second spherical magnetized ferromagnetic element is configured to move along an inner surface of the second spherical enclosure to facilitate alignment of moments of magnetic domains of the second spherical magnetized ferromagnetic element;

a second link having first and second ends, the second link further comprising:
a third spherical enclosure attached to said first end of said second link;
a third spherical magnetized ferromagnetic element un-fixed in position and with freedom of movement within said third enclosure of said second link;
the second link being a magnetized ferromagnetic element such that the second end of the second link is magnetically attached to said second spherical magnetized ferromagnetic element within a magnetic field of said second spherical magnetized ferromagnetic element such that the second spherical magnetized ferromagnetic element is configured to move along an inner surface of the second spherical enclosure of the first link to facilitate alignment of moments of magnetic domains of the second spherical magnetized ferromagnetic element with the second end of the second link;

wherein the first and second links are configured to be rearranged, such that the first, second, and third spherical magnetized ferromagnetic elements will rotate inside their respective spherical enclosures to align corresponding moments of magnetic domains when reattaching the first and second links to each other.

* * * * *